No. 778,373.      Patented December 27, 1904.

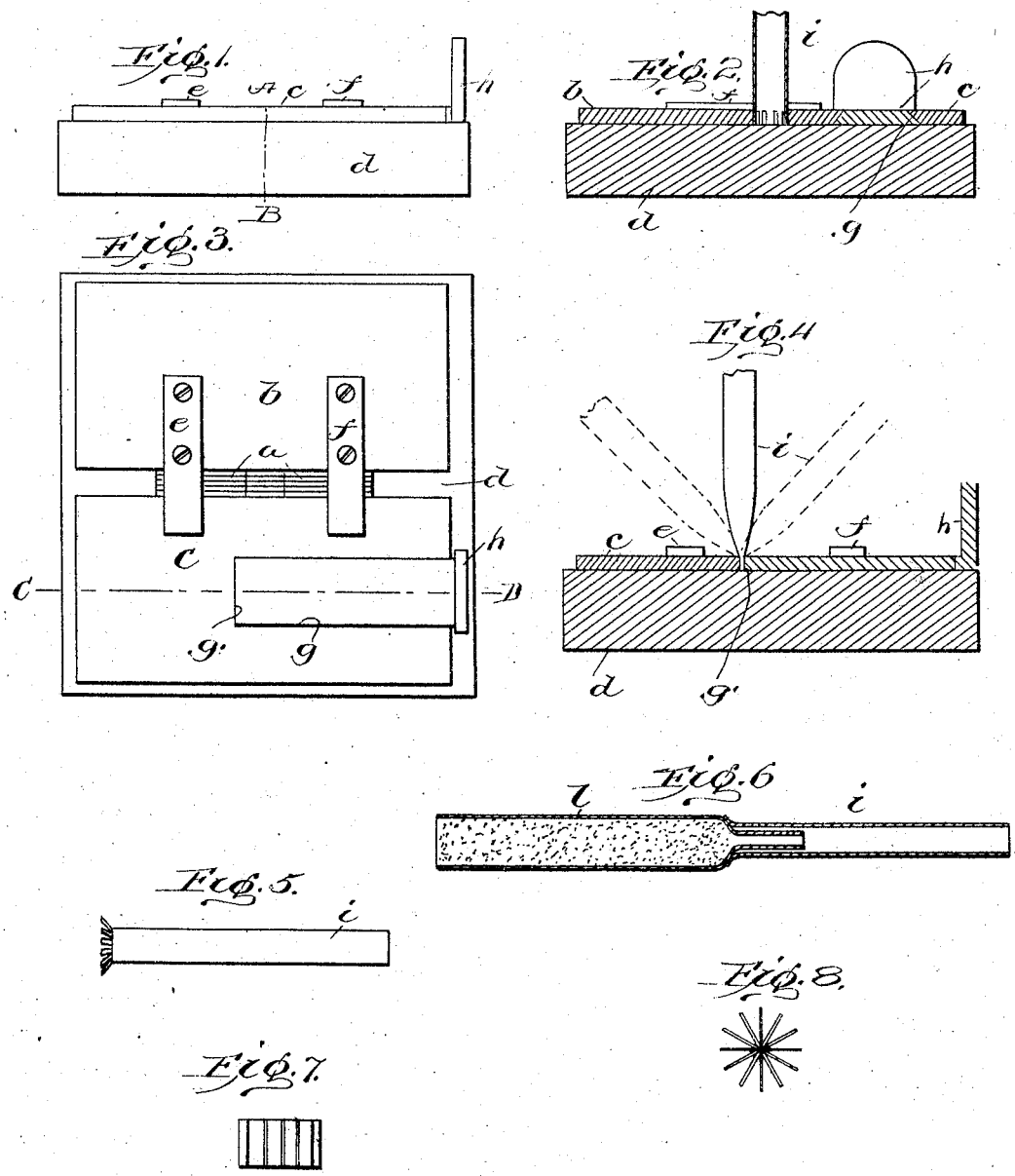

UNITED STATES PATENT OFFICE.

JOSEF PRZEDECKI AND LUDWIG PRZEDECKI, OF BRESLAU, GERMANY.

APPARATUS FOR PREPARING CIGARETTE-MOUTHPIECES.

SPECIFICATION forming part of Letters Patent No. 778,373, dated December 27, 1904.

Application filed May 28, 1903. Serial No. 159,220.

*To all whom it may concern:*

Be it known that we, JOSEF PRZEDECKI and LUDWIG PRZEDECKI, subjects of the Emperor of Germany, residing at Breslau, Germany, have invented certain new and useful Improvements in Apparatus for Preparing Cigarette-Mouthpieces, of which the following is a specification.

The present invention has reference to improvements in apparatus for preparing a straw or reed mouthpiece; and it consists of the construction and combination of parts, as will hereinafter be fully described, and specifically pointed out by the appended claims.

Reference being had to the accompanying drawings, Figure 1 shows a side elevation of the improved apparatus. Fig. 2 is a sectional elevation on line A B of Fig. 1. Fig. 3 is a plan view. Fig. 4 represents a sectional elevation on line C D of Fig. 3. Fig. 5 shows a prepared mouthpiece. Fig. 6 is a sectional elevation of the finished cigarette. Figs. 7 and 8 represent side and plan elevation, respectively, of a modified construction of slitting-tool.

The apparatus essentially consists of a series of slitting-knives or a star-shaped slitting-tool for slitting one end of the mouthpiece and of a clamp for compressing and bending the slitted mouthpiece end.

Upon the bed-plate $d$ are secured between plates $b$ and $c$ a series of slitting-knives $a$ or a star-shaped slitting-tool. (Shown in Figs. 7 and 8.) Cross-plates $e$ and $f$ serve to securely hold the knife-blades in position. In one of the plates—for instance, $c$—is slidingly arranged a dovetail guideway $g$ a clamping slide $h$.

The operation is as follows: The straw $i$ is vertically pressed down upon the knives, as shown in Fig. 2, and the respective end is thereby slitted into a number of strips, the length of which obviously can be regulated by altering the height of the slitting-tool. The slide $h$ is now drawn out, and the slitted end of the straw is introduced into the interspace between the edge $g'$ of the plate $c$ and the slide edge and the slide pushed home again, as shown in Fig. 4, with the result of compressing the mouthpiece and securely clamping it. The straw is now bent over once toward either side, as indicated by dotted lines in Fig. 4, for the purpose of weakening it, so that the slitted strips will readily bend off or spread out, as shown in Fig. 5, without danger of the slits extending beyond the intended depth.

In Fig. 6 we have illustrated a cigarette with our improved mouthpiece attached, which perhaps is more clearly shown in our copending application filed May 28, 1903, Serial No. 159,221. The paper wrapper 1 of the cigarette proper is contracted at one end, so as to allow the split end of the mouthpiece to be slipped over it in order that the strips may engage the tapering part thereof and insure a firm hold, which, if desired, may be further secured by gumming the strips to the wrapper.

What we claim, and desire to secure by Letters Patent, is—

1. In apparatus for preparing straw or the like cigarette-mouthpieces, the combination of a bed-plate, a series of slitting knife-blades arranged parallel to each other on said bed-plate, clamping-plates on said bed-plate adapted to adjustably clamp the said knife-blades, a dovetail guideway of a height corresponding to that of the working part of said knife-blades in one of said clamping-plates, and a clamping-slide, movable in said guideway, all substantially as and for the purpose set forth.

2. In apparatus for preparing straw or the like cigarette-mouthpieces, the combination of a bed-plate, means for slitting the one end of the straw into a plurality of strips, clamping means for adjustably clamping said slitting means to the said bed-plate, a dovetail guideway in one of said clamping-plates, a clamping-slide movable therein, all substantially as and for the purpose set forth.

In testimony that we claim the foregoing as our invention we have signed our names in presence of two subscribing witnesses.

JOSEF PRZEDECKI.
LUDWIG PRZEDECKI.

Witnesses:
ERNST KATZ,
ALBERT SCHENK.